US012693979B2

(12) United States Patent
Kwon et al.

(10) Patent No.: US 12,693,979 B2
(45) Date of Patent: Jul. 28, 2026

(54) HOST DEVICE, MEMORY EXPANDING DEVICE AND SYSTEM FOR PREFETCHING

(71) Applicant: Panmnesia Inc., Daejeon (KR)

(72) Inventors: Mi Ryeong Kwon, Daejeon (KR); Sang Won Lee, Daejeon (KR); Eo Jin Ryu, Daejeon (KR); Dong Pyung Kim, Daejeon (KR)

(73) Assignee: Panmnesia Inc., Daejeon (KR)

( * ) Notice: Subject to any disclaimer, the term of this patent is extended or adjusted under 35 U.S.C. 154(b) by 0 days.

(21) Appl. No.: 18/928,153

(22) Filed: Oct. 27, 2024

(65) Prior Publication Data

US 2025/0378031 A1      Dec. 11, 2025

(30) Foreign Application Priority Data

Jun. 7, 2024    (KR) ........................ 10-2024-0074543

(51) Int. Cl.
  *G06F 12/0862*        (2016.01)
(52) U.S. Cl.
  CPC ................................ *G06F 12/0862* (2013.01)
(58) Field of Classification Search
  None
  See application file for complete search history.

(56) References Cited

U.S. PATENT DOCUMENTS

2006/0265552 A1*  11/2006  Davis .................. G06F 12/0862
                                                    711/137
2019/0102326 A1*   4/2019  Agarwal ............. G06F 13/4282
2022/0116473 A1*   4/2022  Levi .................. H04W 72/1263
2024/0176740 A1*   5/2024  Simmadhari Ramadass ...............
                                                    G06F 12/0877
2024/0241831 A1*   7/2024  Wang .................. G06F 12/0862

OTHER PUBLICATIONS

Miryeong Kwon et al., "Cache in Hand: Expander-Driven CXL Prefetcher for Next Generation CXL-SSDs", HotStorage '23, Jul. 9, 2023, Boston, MA, USA, pp. 24-30.

* cited by examiner

*Primary Examiner* — Baboucarr Faal
(74) *Attorney, Agent, or Firm* — JCIPRNET

(57)        ABSTRACT
A system includes a host device, a memory expanding device, and a switch connecting the host device and the memory expansion device, wherein the host device includes a cache controller including a prefetch support circuit configured to generate prefetch information, a root complex configured to transmit the prefetch information to the memory expanding device and receive prefetch data from the memory expanding device, and one or more prefetch buffers storing the prefetch data, and the memory expanding device includes a memory device and a memory controller including a prefetch decision circuit configured to read the prefetch data from the memory device based on the prefetch information received from the host device and prefetch the prefetch data to the host device.

6 Claims, 8 Drawing Sheets

HOST DEVICE, MEMORY EXPANDING DEVICE AND SYSTEM FOR PREFETCHING

CROSS-REFERENCE TO RELATED APPLICATION

This application is based on and claims priority under 35 U.S.C. § 119 to Korean Patent Application No. 10-2024-0074543, filed on Jun. 7, 2024, in the Korean Intellectual Property Office, the disclosure of which is incorporated by reference herein in its entirety.

BACKGROUND

1. Field

The disclosure relates to a host device, a memory expanding device, and a system for predicting a storage location and required time of data required by a running program at a future point in time and prefetching the data.

2. Description of the Related Art

A host device may access various types of memory devices (e.g., solid state drive (SSD), dynamic random access memory (DRAM), etc.) through an interface such as a compute express link (CXL).

When the host device accesses a memory device connected through a CXL, relatively long latency occurs compared to accessing a memory device inside the host device. To reduce the latency, the host device may prefetch data required for program execution into its internal cache.

In order to accurately prefetch data from a memory device connected through a CXL, a high accuracy prefetch logic is required. However, because the high accuracy prefetch logic occupies a relatively large area, it is difficult to place the high accuracy prefetch logic inside the host device.

In addition, one or more switches may exist between the host device and a memory device connected through a CXL. In this case, the latency required for prefetching may vary depending on the number of switches between the host device and the memory device. At this time, data prefetched too early may be removed again by a cache replacement policy, and data prefetched too late may cause cache misses. Accordingly, a situation in which data may not be prefetched at a desired time may occur.

SUMMARY

Provided are a host device, a memory expanding device, and a system for accurately prefetching necessary data at a desired time.

Additional aspects will be set forth in part in the description which follows and, in part, will be apparent from the description, or may be learned by practice of the presented embodiments of the disclosure.

According to an aspect of the disclosure, a host device connected to a memory expanding device, includes a cache controller including a prefetch support circuit configured to generate prefetch information, a root complex configured to transmit the prefetch information to the memory expanding device and receive prefetch data from the memory expanding device, and one or more prefetch buffers storing the prefetch data.

Also, the prefetch information of the host device according to an aspect of the disclosure may include at least one of a Program Counter (PC) and a memory address.

Also, the cache controller of the host device according to an aspect of the disclosure may be configured to search the prefetch buffer for requested data required by the host device, and when the request data is found in the prefetch buffer, read the requested data from the prefetch buffer.

Also, the prefetch support circuit of the host device according to an aspect of the disclosure may be further configured to, when a cache hit occurs, transmit cache hit information and the prefetch information to the memory expanding device through the root complex.

Also, the prefetch support circuit of the host device according to an aspect of the disclosure may be further configured to acquire a device latency and switch level of the memory expanding device while a device enumeration operation is performed and transmit transmission latency acquired based on the device latency and a switch latency by the switch level, to the memory expanding device through the root complex.

According to another aspect of the disclosure, a memory expanding device connected to a host device, includes a memory device and a memory controller including a prefetch decision circuit configured to read prefetch data from the memory device based on prefetch information received from the host device and prefetch the prefetch data to the host device.

The prefetch information of the host device according to an aspect of the disclosure may include at least one of a Program Counter (PC) and a memory address, wherein the prefetch decision circuit may be further configured to determine a prefetch address for reading the prefetch data based on the prefetch information and read the prefetch data from the prefetch address of the memory device.

Also, the prefetch decision circuit of the host device according to an aspect of the disclosure may be further configured to determine the prefetch address by using a first model that determines the prefetch address based on the PC and a second model that determines the prefetch address based on the memory address.

Also, the prefetch decision circuit of the host device according to an aspect of the disclosure may be further configured to store the prefetch address and the prefetch data.

Also, the prefetch support circuit of the host device according to an aspect of the disclosure may include a time buffer storing request time information when a request is received from the host device.

Also, the prefetch support circuit of the host device according to an aspect of the disclosure may be further configured to, when there is request time information missing due to a cache hit that occurred in the host device, determine the missing request time information based on cache hit information received from the host device.

Also, the prefetch support circuit of the host device according to an aspect of the disclosure may be further configured to determine a prefetch time point, which is a time point at which the prefetch data is prefetched to the host device, based on the request time information and a transmission latency received from the host device.

Also, the prefetch decision circuit of the host device according to an aspect of the disclosure may be further configured to prefetch the prefetch data to the host device at the prefetch time point.

According to another aspect of the disclosure, a system includes a host device and a memory expanding device, wherein the host device includes a cache controller including a prefetch support circuit configured to generate prefetch information, a root complex configured to transmit the prefetch information to the memory expanding device and receive prefetch data from the memory expanding device, and one or more prefetch buffers storing the prefetch data, and wherein the memory expanding device includes a memory device and a memory controller including a prefetch decision circuit configured to read the prefetch data from the memory device based on the prefetch information received from the host device and prefetch the prefetch data to the host device.

Also, the cache controller of the system according to an aspect of the disclosure may be configured to search the prefetch buffer for the requested data required by the host device, and when the requested data is found in the prefetch buffer, read the requested data from the prefetch buffer.

Also, the prefetch support circuit of the system according to an aspect of the disclosure, may be further configured to, when a cache hit occurs, transmit cache hit information and the prefetch information to the memory expanding device through the root complex.

Also, the system according to an aspect of the disclosure may further include a switch connecting the host device and the memory expanding device, wherein the prefetch support circuit may be further configured to acquire a device latency and a switch level of the memory expanding device while a device enumeration operation is performed, and transmit a transmission latency acquired based on the device latency and a switch latency by the switch level, to the memory expanding device through the root complex.

Also, the prefetch information of the system according to an aspect of the disclosure may include at least one of a Program Counter (PC) and a memory address, wherein the prefetch decision circuit may be further configured to determine a prefetch address for reading the prefetch data based on the prefetch information and read the prefetch data from the prefetch address of the memory device.

Also, the prefetch decision circuit of the system according to an aspect of the disclosure may include a time buffer storing request time information when a request is received from the host device.

Also, the prefetch decision circuit of the system according to an aspect of the disclosure may be further configured to determine a prefetch time point, which is a time point at which the prefetch data is prefetched to the host device, based on the request time information and a transmission latency received from the host device, and prefetch the prefetch data to the host device at the prefetch time point.

BRIEF DESCRIPTION OF THE DRAWINGS

The above and other aspects, features, and advantages of certain embodiments of the disclosure will be more apparent from the following description taken in conjunction with the accompanying drawings, in which.

4

Figure 6:
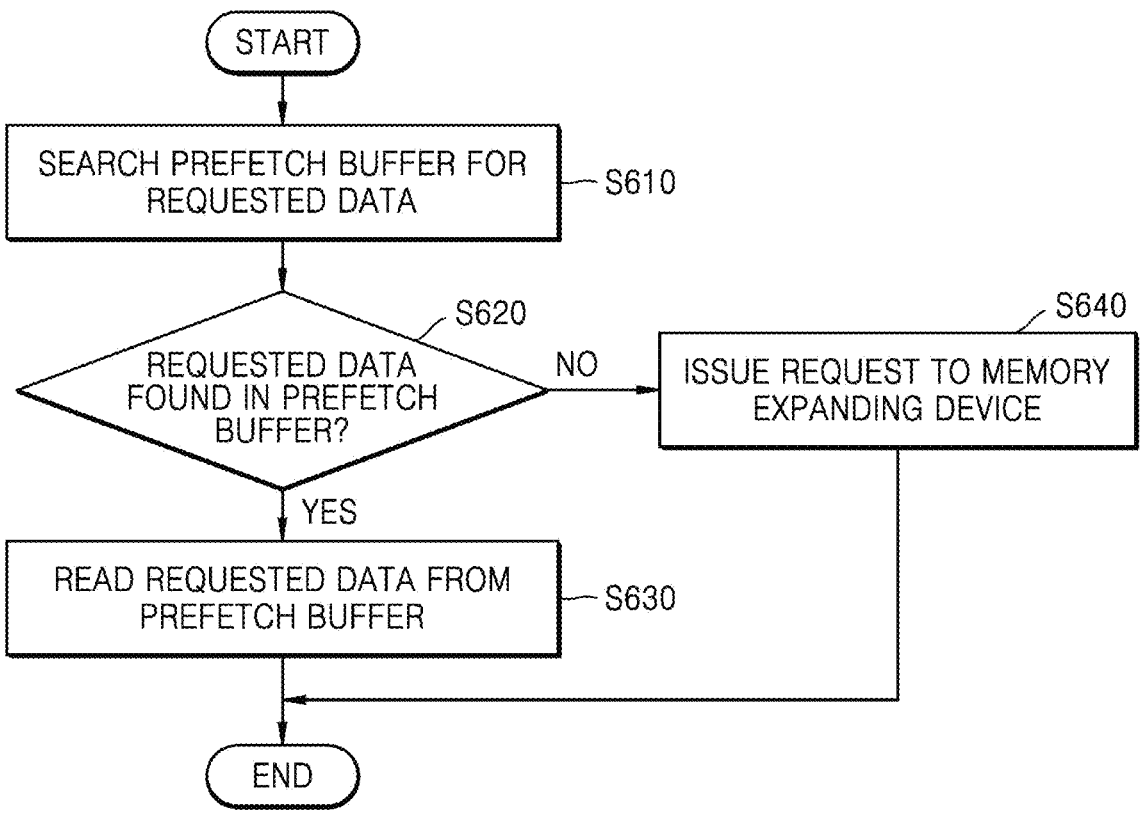
Figure 7:
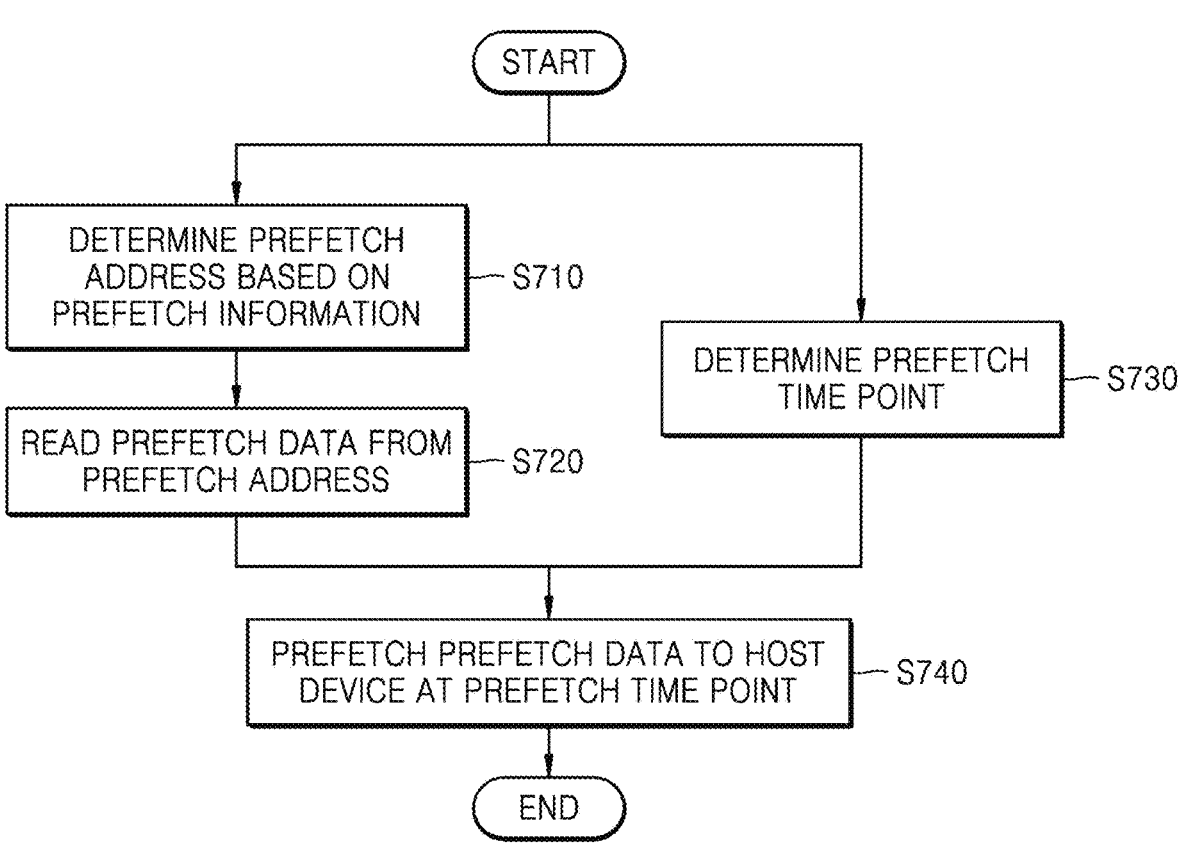
Figure 8:
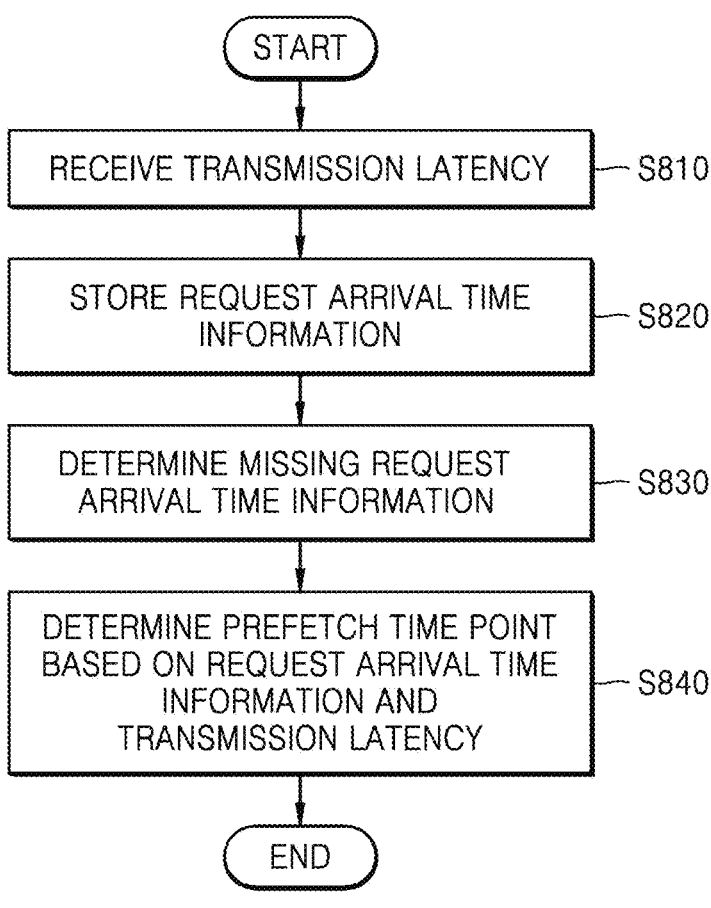

FIG. 6 is a flowchart showing a method of using a prefetch buffer of a host device, according to an embodiment;

FIG. 7 is a flowchart showing a method by which a memory expanding device prefetches data, according to an embodiment; and FIG. 8 is a flowchart showing a method by which a memory expanding device determines a prefetch time, according to an embodiment.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described in detail with reference to the accompanying drawings.

Figure 1:
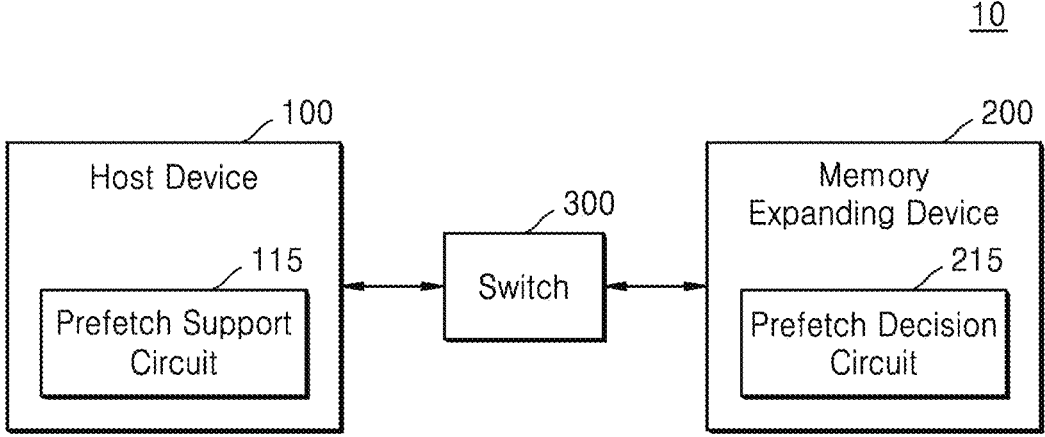
FIG. 1 is a block diagram showing a system according to an embodiment.

FIG. 1 is a block diagram showing a system 10 according to an embodiment.

Referring to FIG. 1, the system 10 according to an embodiment may include a host device 100 and a memory expanding device 200. The system 10 according to an embodiment may further include a switch 300.

The system 10 may be a computing system that performs various types of operations through the host device 100 based on data stored in the memory expanding device 200. For example, the system 10 may be included in a desktop computer, a server, etc.

In an embodiment, the host device 100, the memory expanding device 200, and the switch 300 included in the system 10 may be connected via a compute express link (CXL) interface. However, the disclosure is not limited thereto, and embodiments may be applied to other interfaces.

The host device 100 may performs an operation required in the system 10. For example, the host device 100 may be any one of a central processing unit (CPU), a graphics processing unit (GPU), a neural processing unit (NPU), etc.

In an embodiment, the host device 100 may include a prefetch support circuit 115. The prefetch support circuit 115 may generate prefetch information required to prefetch data in the memory expanding device 200 and transmit the prefetch information to the memory expanding device 200 through a root complex. In addition, the prefetch support circuit 115 may acquire a transmission latency based on a device latency and a switch level of the memory expanding device 200 and transmit the transmission latency to the memory expanding device 200 through the root complex. In addition, when a cache hit occurs in the host device 100, the prefetch support circuit 115 may transmit cache hit information and prefetch information to the memory expanding device 200 through the root complex. More specific operations of the prefetch support circuit 115 is described later with reference to FIG. 2 and below.

At this time, because the host device 100 uses most of an area to perform the operation required in the system 10, the host device 100 may use a relatively small additional area compared to the memory expanding device 200. Therefore, when a prefetch decision circuit 215, which is described later, is included in the host device 100, a prefetch logic with high accuracy (for example, a prefetch logic using a machine learning model) may not be used due to an area limitation.

The memory expanding device 200 may store data required for the operation performed in the host device 100. For example, the memory expanding device 200 may include one of a solid state drive (SSD), a dynamic random access memory (DRAM), a storage class memory (SCM), etc. Although FIG. 1 illustrates an embodiment in which one memory expanding device 200 is connected to the host device 100, unlike this case, a case in which a plurality of memory expanding devices is connected to the host device 100 is also possible.

In an embodiment, the memory expanding device 200 may include the prefetch decision circuit 215. The prefetch decision circuit 215 may read prefetch data from an internal memory device based on prefetch information received from the host device 100 and prefetch the prefetch data to the host device 100. The prefetch decision circuit 215 determines a prefetch address to read prefetch data based on prefetch information and may read prefetch data from the prefetch address of the memory device. In addition, when the prefetch decision circuit 215 receives a request from the host device 100, the prefetch decision circuit 215 may determine a prefetch time point, which is a time point at which prefetch data is prefetched to the host device 100, based on request time information and a transmission latency received from the host device 100. More specific operations of the prefetch decision circuit 215 are described later with reference to FIG. 3 and below.

In this way, when the host device 100 generates prefetch information through the prefetch support circuit 115 and transmits the prefetch information to the memory expanding device 200, the memory expanding device 200 may read prefetch data through the prefetch decision circuit 215 and prefetch the prefetch data to the host device 100. That is, an operation of determining the prefetch address and prefetch timing performed to read the prefetch data may be performed in the memory expanding device 200.

At this time, because the memory expanding device 200 may provide a relatively large area to the prefetch decision circuit 215 than the host device 100, the operation of determining the prefetch address and prefetch timing may be performed using a prefetch logic having high accuracy that occupies a relatively large area. That is, when the prefetch decision circuit 215 is included in the memory expanding device 200 having a relatively large area, data may be prefetched using a prefetch logic having high accuracy (for example, a prefetch logic using a machine learning model). Through this, prefetch data may be prefetched to the host device (100) more accurately. In addition, by determining the prefetch time and prefetching the prefetch data at an accurate time, necessary data may be prefetched at a desired time.

The switch 300 may connect the host device 100 and the memory expanding device 200. At this time, the switch 300 is not an essential component, and the host device 100 and the memory expanding device 200 may be directly connected without going through the switch 300. The host device 100 may be connected to the memory expanding device 200 through the switch 300. The memory expanding device 200 may be connected to the host device 100 through the switch 300. In FIG. 1, an embodiment is illustrated in which one switch 300 connects the host device 100 and the memory expanding device 200, but, unlike this, a plurality of switches may connect the host device 100 and the memory expanding device 200.

Figure 2:
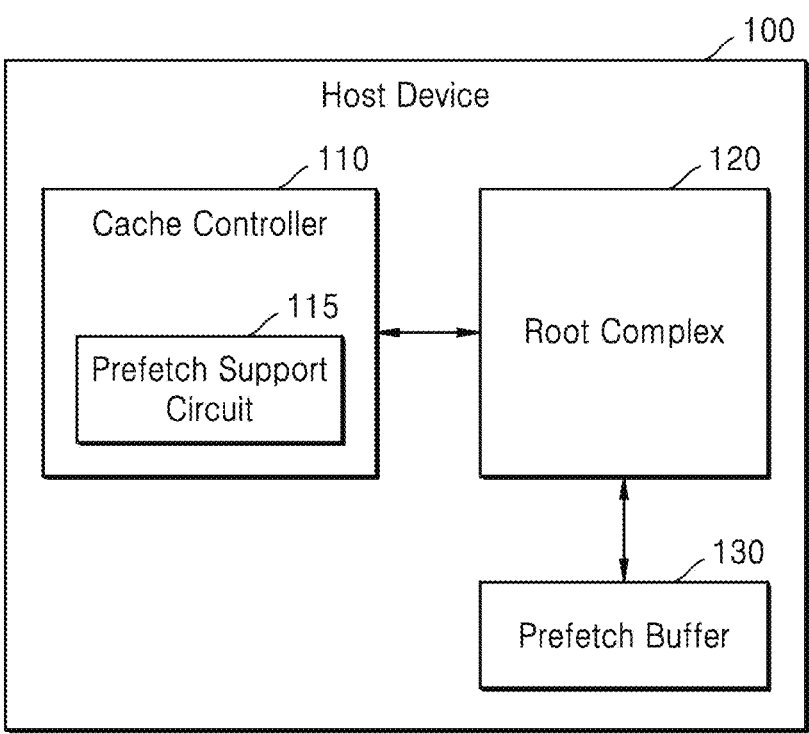
FIG. 2 is a block diagram showing a host device according to an embodiment.

FIG. 2 is a block diagram illustrating the host device 100 according to an embodiment.

Referring to FIG. 2, the host device 100 according to an embodiment may include a cache controller 110, a root complex 120, and a prefetch buffer 130. FIG. 2 is illustrated focusing on the essential components for the description of the disclosure, and the host device 100 may further include other components not illustrated in FIG. 2, such as a cache.

The cache controller 110 may control an overall operation related to the cache included in the host device 100. The cache controller 110 may include the prefetch support circuit 115.

Although FIG. 2 illustrates an embodiment in which the prefetch support circuit 115 is located within the cache controller 110, the disclosure is not limited thereto, and the prefetch support circuit 115 may be located within the root complex 120, and the prefetch support circuit 115 may be located divingly within the cache controller 110 and the root complex 120.

In an embodiment, the prefetch support circuit 115 may generate prefetch information. The prefetch information may be information required for prefetching data in the prefetch decision circuit 215 included in the memory expanding device 200. The prefetch information may include at least one of a program counter (PC) and a memory address. The PC may be a value indicating the location of a command to be executed next in the host device 100. The memory address may be an address in which data required by the host device 100 is stored within the memory expanding device 200. When the prefetch information arrives at the memory expanding device 200, the memory expanding device 200 may read the prefetch data from an internal memory device based on the prefetch information. The prefetch data may be data that is to be prefetched from the memory expanding device 200 to the host device 100.

In an embodiment, when a cache hit occurs in the cache controller 110, the prefetch support circuit 115 may transmit cache hit information and prefetch information to the memory expanding device 200 through the root complex 120. The cache hit information may be information that notifies that a cache hit has occurred in the cache controller 110. When the cache hit information arrives at the memory expanding device 200, the memory expanding device 200 may determine a missing request time information based on the request-issue time information included in the cache hit information. That is, when a cache hit occurs in the controller 110, the prefetch support circuit 115 may transmit the prefetch information and the cache hit information to the memory expanding device 200.

In contrast, when a cache miss occurs in the controller 110, the prefetch support circuit 115 may transmit a request (e.g., a read request) to the memory expanding device 200 to obtain request data from the memory expanding device 200. In addition, when a cache miss occurs in the controller 110, the prefetch support circuit 115 may transmit prefetch information and request time information to the memory expanding device 200.

In an embodiment, the prefetch support circuit 115 may acquire a device latency and a switch level of the memory expanding device 200 while a device enumeration operation of the host device 100 is performed. The device enumeration operation may be an operation in which the host device 100 acquires information related to devices connected thereto. For example, the host device 100 may acquire, through the device enumeration operation, information such as which memory expanding device 200 has been connected, through which switch 300 the memory expanding device 200 has been connected, etc.

The prefetch support circuit 115 may acquire a device latency of the memory expanding device 200 connected to the host device 100 while the device enumeration operation is performed. The device latency may be a latency that occurs in the transmission of prefetch data due to the memory expanding device 200 itself. For example, the prefetch support circuit 115 may acquire the device latency of the memory expanding device 200 by extracting a device scoped latency and bandwidth information structure (DSL-BIS) in data object exchange (DOE) of the memory expanding device 200.

The prefetch support circuit 115 may acquire a switch level of the memory expanding device 200 by identifying the number of switches 300 between the host device 100 and the connected memory expanding device 200 while the device enumeration operation is performed. At this time, the switch level may be the number of switches 300 connected between the host device 100 and the memory expanding device 200.

The prefetch support circuit 115 may acquire a transmission latency based on the device latency and the switch latency based on the switch level and transmit the acquired transmission latency to the memory expanding device 200 through the root complex 120. The switch latency may be a latency that occurs in the transmission of prefetch data by the switches 300 connected between the host device 100 and the memory expanding device 200. The transmission latency may be the total latency that occurs in the transmission of prefetch data from the memory expanding device 200 to the host device 100. When the transmission latency arrives at the memory expanding device 200, the memory expanding device 200 may determine the prefetch time point based on the transmission latency.

The root complex 120 may connect configurations inside the host device 100 with devices such as the memory expanding device 200 outside the host device 100. In an embodiment, the root complex 120 may connect the configurations inside the host device 100 with devices such as the memory expanding device 200 outside the host device 100 based on the CXL.

The root complex 120 may transmit the prefetch information generated by the prefetch support circuit 115 to the memory expanding device 200. In addition, the root complex 120 may transmit cache hit information to the memory expanding device 200. In addition, the root complex 120 may transmit the transmission latency acquired by the prefetch support circuit 115 to the memory expanding device 200.

The root complex 120 may receive prefetch data from the memory expanding device 200.

The prefetch buffer 130 may store the prefetch data. That is, the prefetch data received through the root complex 120 may be stored in the prefetch buffer 130. In FIG. 2, although it is illustrated an embodiment in which the prefetch buffer 130 is located outside the root complex 120, the disclosure is not limited thereto, and the prefetch buffer 130 may be located inside the prefetch support circuit 115 or inside the root complex 120.

As the prefetch data is stored in the prefetch buffer 130, the cache controller 110 may search the prefetch buffer 130 for request data, which is data required by the host device 100. When the request data is found in the prefetch buffer 130, the cache controller 110 may read the request data from the prefetch buffer 130. When the request data is read from the prefetch buffer 130, cache hit information and prefetch information may be transmitted to the memory expanding device 200.

Figure 3:
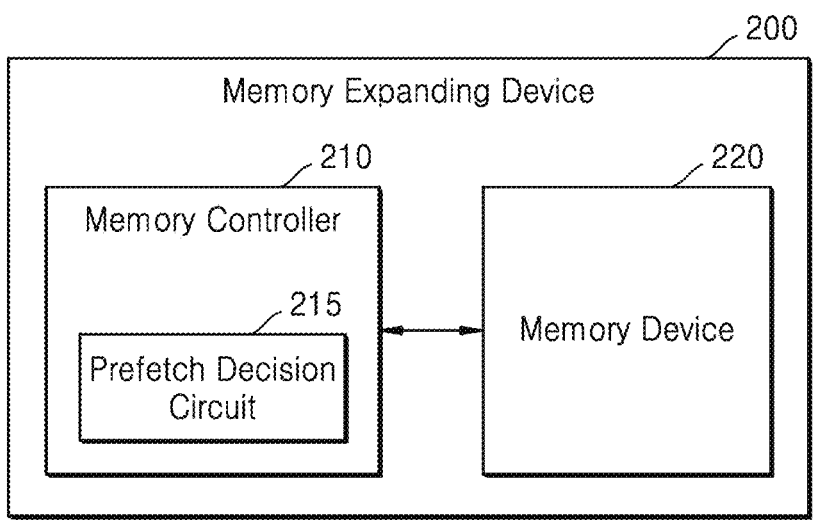
FIG. 3 is a block diagram showing a memory expanding device according to an embodiment.

FIG. 3 is a block diagram showing the memory expanding device 200 according to an embodiment.

Referring to FIG. 3, the memory expanding device 200 according to an embodiment may include a memory controller 210 and a memory device 220. FIG. 3 is illustrated focusing on the essential components for the description of the disclosure, and the memory expanding device 200 may further include other components not illustrated in FIG. 3.

The memory controller 210 may control an overall operation of the memory expanding device 200. The memory controller 210 may include the prefetch decision circuit 215.

In an embodiment, the prefetch decision circuit 215 may read prefetch data from a memory device based on prefetch information received from the host device 100.

The prefetch decision circuit 215 may determine a prefetch address to read prefetch data based on the prefetch information. The prefetch address may be an address where prefetch data is stored.

The prefetch decision circuit 215 may determine the prefetch address using a machine learning model. In this time, the prefetch decision circuit 215 may determine the prefetch address using a plurality of different types of machine learning models. In an embodiment, when the prefetch information includes a PC and a memory address, the prefetch decision circuit 215 may determine a prefetch address using a first model that determines the prefetch address based on the PC and a second model that determines the prefetch address based on the memory address. Here, the first model and the second model may be different machine learning models.

The prefetch decision circuit 215 may read the prefetch data from the prefetch address determined based on the prefetch information. In this way, by determining a prefetch address and reading the prefetch data using various types of machine learning models having high accuracy, the prefetch data may be prefetched to the host device 100 more accurately.

The prefetch decision circuit 215 may store the prefetch address and the prefetch data therein. The prefetch decision circuit 215 may use the prefetch address and the prefetch data stored therein for fine-tuning of an internal machine learning model.

In an embodiment, the prefetch decision circuit 215 may include a time buffer (not shown). The time buffer may store request time information. The request time information may be a time for a request transmitted from the host device 100. In one example, the request time information may be request issuance time information issued from the host device 100 to the memory expanding device 200. In another example, the request time information may be request arrival time information arrived at the memory expanding device 200 by being transmitted from the host device 100. However, the disclosure is not limited to these examples. When the prefetch decision circuit 215 receives a request from the host device 100, the prefetch decision circuit 215 may store the request time information in the time buffer.

At this time, when a cache hit occurs in the cache controller 110 of the host device 100, the host device 100 may not transmit the request to the memory expanding device 200. In this way, when the memory expanding device 200 does not receive the request, the request time information may be missing.

In an embodiment, when there is request time information missing due to a cache hit occurring in the host device 100, the prefetch decision circuit 215 may determine the missing request time information based on the cache hit information received from the host device 100. As described above with reference to FIG. 2, when a cache hit occurs, the host device 100 may transmit cache hit information to the memory expanding device 200. When the prefetch decision circuit 215 receives cache hit information from the host device 100, the prefetch decision circuit 215 may determine missing request time information based on the cache hit information.

In an embodiment, the prefetch decision circuit 215 may determine a prefetch time point, which is a time point at which prefetch data is prefetched to the host device 100 based on the request time information and the transmission latency received from the host device 100.

In more detail, the prefetch decision circuit 215 may predict the next request time information based on the request time information stored in the time buffer. In one example, when the request time information is request-issue time information, the prefetch decision circuit 215 may predict the next request-issue time information. In another example, when the request time information is request arrival time information, the prefetch decision circuit 215 may predict the next request arrival time information.

At this time, when there is missing request time information, the prefetch decision circuit 215 may supplement the missing request time information by determining the missing request time information based on the cache hit information, and then predict the next request time information.

Then, the prefetch decision circuit 215 may determine the prefetch time based on the next request information and the transmission latency. In one example, when the request time information is request-issue time information, the prefetch decision circuit 215 may determine the prefetch time by subtracting the transmission latency from the next request time. In another example, when the request time information is request arrival time information, the prefetch decision circuit 215 may determine the prefetch time by subtracting the round-trip transmission latency (for example, twice the transmission latency) from the next request time.

In an embodiment, the prefetch decision circuit 215 may prefetch prefetch data to the host device 100. The prefetch decision circuit 215 may prefetch prefetch data into the prefetch buffer 130 of the host device 100. At this time, the prefetch decision circuit 215 may prefetch prefetch data to the host device 100 at a prefetch time. In this way, by determining the prefetch time and prefetching prefetch data at an accurate time, necessary data may be prefetched at a desired time.

The memory device 220 may store data required for an operation performed by the host device 100. For example, the memory device 220 may be any one of devices capable of storing data, such as an SSD, DRAM, SCM, etc. In the embodiment of FIG. 3, one memory device 220 is illustrated as being included in the memory expanding device 200, but the disclosure is not limited thereto, and a plurality of memory devices may be included in the memory expanding device 200.

Figure 4:
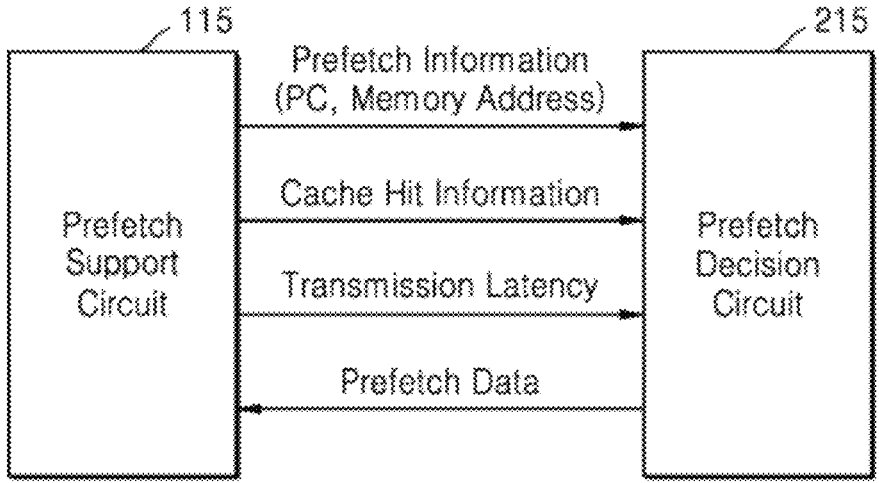
FIG. 4 is a diagram showing data exchanged between a prefetch support circuit of a host device and a prefetch decision circuit of a memory expanding device, according to an embodiment.

FIG. 4 is a diagram showing data exchanged between the prefetch support circuit 115 of the host device 100 and the prefetch decision circuit 215 of the memory expanding device 200, according to an embodiment.

Referring to FIG. 4, data exchanged between the prefetch support circuit 115 and the prefetch decision circuit 215 according to an embodiment of may be confirmed. In the embodiment of FIG. 4, data transmission from the prefetch support circuit 115 to the prefetch decision circuit 215 may be transmission via the root complex 120 included in the host device 100.

In an embodiment, the prefetch support circuit 115 may transmit prefetch information to the prefetch decision circuit 215. At this time, the prefetch information may include a PC and a memory address. At this time, when prefetch information is received, the prefetch decision circuit 215 may determine a prefetch address based on prefetch information. At this time, the prefetch decision circuit 215 may determine the prefetch address using different types of machine learning models. Then, the prefetch decision circuit 215 may read prefetch data from the prefetch address.

In an embodiment, the prefetch support circuit 115 may transmit cache hit information to the prefetch decision circuit 215. When the prefetch decision circuit 215 receives the cache hit information, the prefetch decision circuit 215 may determine missing request time information from the time buffer based on the cache hit information.

In an embodiment, the prefetch support circuit 115 may transmit the transmission latency to the prefetch decision circuit 215. The prefetch decision circuit 215 may determine a prefetch time based on the transmission latency and the request time information after determining the prefetch address. The prefetch decision circuit 215 may prefetch the prefetch data read from the prefetch address into the prefetch buffer 130 at the prefetch time.

Figure 5:
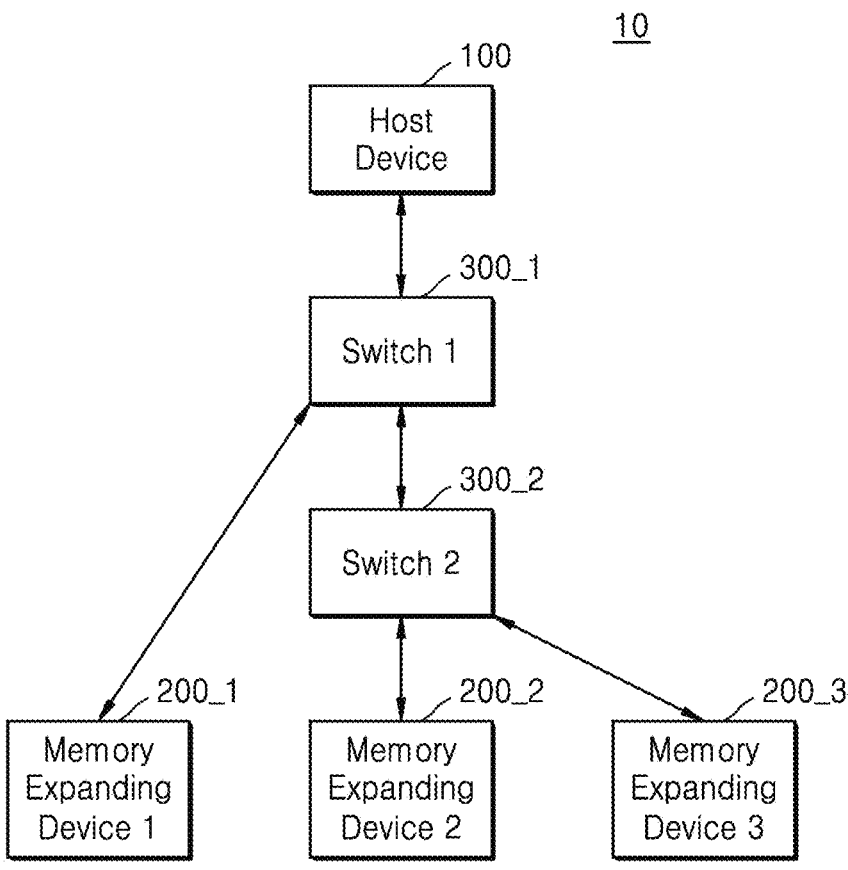
FIG. 5 is a block diagram showing an example of a switch connection structure of a system, according to an embodiment.

FIG. 5 is a block diagram showing an example of a switch connection structure of a system 10, according to an embodiment.

Referring to FIG. 5, the system 10 according to an embodiment may include a host device 100, a first memory expanding device 200_1, a second memory expanding device 200_2, a third memory expanding device 200_3, a first switch 300_1, and a second switch 300_2.

In the embodiment of FIG. 5, the first memory expanding device 200_1 may be connected to the host device 100 via the first switch 300_1. That is, the host device 100 and the first memory expanding device 200_1 may be connected via one switch, where the switch level may be determined as 1. The switch level may also be referred to as another term, such as switch depth.

In the embodiment of FIG. 5, the second memory expanding device 200_2 may be connected to the host device 100 through the first switch 300_1 and the second switch 300_2. That is, the host device 100 and the second memory expanding device 200_2 may be connected through two switches, and here, the switch level may be determined as 2.

In the embodiment of FIG. 5, the third memory expanding device 200_3 may be connected to the host device 100 through the first switch 300_1 and the second switch 300_2. That is, the host device 100 and the third memory expanding device 200_3 may be connected through two switches, and here, the switch level may be determined as 2.

In this embodiment, because the number of switches between the host device 100 and the first memory expanding device 200_1 is less than the number of switches between the host device 100 and the second memory expanding device 200_2, a switch latency between the host device 100 and the first memory expanding device 200_1 may be shorter than a switch latency between the host device 100 and the second memory expanding device 200_2.

Similarly, because the number of switches between the host device 100 and the first memory expanding device 200_1 is less than the number of switches between the host device 100 and the third memory expanding device 200_3, a switch latency between the host device 100 and the first memory expanding device 200_1 may be shorter than a switch latency between the host device 100 and the third memory expansion device 200_3.

FIG. 6 is a flowchart illustrating a method of using a prefetch buffer of a host device, according to an embodiment.

Referring to FIG. 6, in operation S610, the host device 100 may search the prefetch buffer 130 for request data through the cache controller 110. At this time, when the request data is not found in the cache included in the host device 100, the cache controller 110 may search the prefetch buffer 130 for the request data before transmitting a request to the memory expansion device 200.

In operation S620, the host device 100 may determine whether the request data is found in the prefetch buffer 130 through the cache controller 110.

When the request data is found in the prefetch buffer 130, the process moves to operation S630, and the host device 100 may read the request data from the prefetch buffer 130 through the cache controller 110. At this time, the host device 100 may transmit cache hit information and prefetch information to the memory expanding device 200.

When the request data is not found in the prefetch buffer 130, the process moves to operation S640, and the host device 100 may issue a request to the memory expanding device 200 through the cache controller 11). For example, the cache controller 110 may issue a read request for the request data not found in the prefetch buffer 130 to the memory expanding device 200.

FIG. 7 is a flowchart showing a method by which a memory expanding device prefetches data, according to an embodiment.

Referring to FIG. 7, in operation S710, the memory expanding device 200 may determine a prefetch address based on prefetch information through the prefetch decision circuit 215. The prefetch decision circuit 215 may determine the prefetch address based on a PC and memory address included in the prefetch information by using different types of machine learning models from each other.

In operation S720, the memory expanding device 200 may read the prefetch data from the prefetch address through the prefetch decision circuit 215. The prefetch decision circuit 215 may read the prefetch data from the address corresponding to the prefetch address of the memory device 220.

Operation S730 may be performed in parallel with operations S710 and S720 as described above. In this case, operation S730 may be performed simultaneously with operations S710 and S720, and in some cases, operation S730 may be performed before operations S710 and S720, or operation S730 may be performed after operations S710 and S720.

In operation S730, the memory expanding device 200 may determine a prefetch time point through the prefetch decision circuit 215. A more detailed method of determining the prefetch time point is described with reference to FIG. 8.

FIG. 8 is a flowchart showing a method by which a memory expanding device determines the prefetch time point, according to an embodiment.

Referring to FIG. 8, it may be confirmed an embodiment in which the memory expansion device 200 determines the prefetch time point through the prefetch decision circuit 215. At this time, the embodiment of FIG. 8 is written mainly based on an embodiment in which the request time information is request arrival time information, but the disclosure is not limited thereto. Unlike the embodiment of FIG. 8, even in the case when the request time information is request-issue time information, the embodiment of FIG. 8 may be appropriately modified and used.

In operation S810, the memory expanding device 200 may receive a transmission latency through the prefetch decision circuit 215. The transmission latency may be received while the device enumeration operation is being performed in the host device 100. In FIG. 8, although an example in which the transmission latency is transmitted initially is illustrated, the disclosure is not limited thereto.

Unlike FIG. 8, even while operations S820 to S840 are being performed, when there is another device additionally connected to the host device 100, the memory expanding device 200 may receive a transmission latency from the host device 100.

In operation S820, the memory expanding device 200 may store request arrival time information through the prefetch decision circuit 215. The prefetch decision circuit 215 may store request arrival time information received from the host device 100 in a time buffer.

In operation S830, the memory expanding device 200 may determine missing request arrival time information through the prefetch decision circuit 215. The prefetch decision circuit 215 may determine missing request arrival time information based on the request-issue time information included in the cache hit information.

In FIG. 8, although an embodiment in which request arrival time information is stored in operation S820 and then missing request arrival time information is determined in operation S830 is illustrated, the disclosure is not limited thereto. Unlike the embodiment of FIG. 8, when a cache hit occurs first in the host device 100, the missing request arrival time information may be determined first as the cache hit occurs, and then the received request arrival time information may be stored as the cache miss occurs.

In addition, although the embodiment of FIG. 8 is illustrated as that operations S820 and S830 are performed once, the disclosure is not limited thereto, and operations S820 and S830 may be repeatedly performed regardless of the order as cache hits and cache misses occur in the host device 100.

In operation S840, the memory expanding device 200 may determine a prefetch time based on the request arrival time information and the transmission latency through the prefetch decision circuit 215. The prefetch decision circuit 215 may predict the next request arrival time based on the request arrival time information and may determine the prefetch time by subtracting the round-trip transmission latency (for example, twice the transmission latency) from the predicted next request time.

Returning to FIG. 7 again, in operation S740, the memory expanding device 200 may prefetch prefetch data to the host device 100 at a prefetch time through the prefetch decision circuit 215. At this time, the prefetch decision circuit 215 may prefetch prefetch data into the prefetch buffer 130 of the host device 100.

As described above, when the prefetch support circuit 115 of the host device 100 transmits prefetch information, the prefetch decision circuit 215 included in the memory expanding device 200 determines a prefetch address using different types of machine learning models, and reads prefetch data from the determined prefetch address, thereby improving the accuracy of the prefetch operation. In addition, by determining a prefetch time point in the prefetch decision circuit 215 included in the memory expanding device 200 and prefetching prefetch data into the host device 100 at the prefetch time point, data may be prefetched at a desired time point.

According to the host device of the technical idea of the disclosure, by placing a high precision prefetch model requiring a large area inside a memory expanding device instead of inside a host device and performing prefetch, it is possible to prefetch required data more accurately. In addition, according to the memory expanding device of the technical idea of the disclosure, the prefetch time is determined based on the request time information and the transmission latency, and by prefetching data into the host device at the prefetch time, data may be prefetched at a desired time. As described above, example embodiments have been disclosed in the drawings and specifications. In the present specification, the example embodiments are described by using some specific terms, but the terms used are for the purpose of describing the technical scope of the disclosure only and are not intended to be limiting of meanings or the technical scope described in the claims.

Therefore, it will be understood by those skilled in the art that various changes in form and details may be made therein without departing from the spirit and scope of the disclosure as defined by the appended claims.

Accordingly, the scope of the disclosure is defined not by the detailed description of the disclosure but by the appended claims.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A memory expanding device connected to a host device, the memory expanding device comprising:

a memory device; and a memory controller including a prefetch decision circuit configured to read prefetch data from the memory device based on prefetch information received from the host device and prefetch the prefetch data to the host device, wherein the prefetch decision circuit includes a time buffer storing request time information when a request is received from the host device, and the prefetch decision circuit is further configured to, when there is request time information missing due to a cache hit that occurred in the host device, determine the missing request time information based on cache hit information received from the host device.

2. The memory expanding device of claim 1, wherein the prefetch information includes at least one of a Program Counter (PC) and a memory address, and wherein the prefetch decision circuit is further configured to determine a prefetch address for reading the prefetch data based on the prefetch information and read the prefetch data from the prefetch address of the memory device.

3. The memory expanding device of claim 2, wherein the prefetch decision circuit is further configured to determine the prefetch address by using a first model that determines the prefetch address based on the PC and a second model that determines the prefetch address based on the memory address.

4. The memory expanding device of claim 2, wherein the prefetch decision circuit is further configured to store the prefetch address and the prefetch data.

5. The memory expanding device of claim 1, wherein the prefetch decision circuit is further configured to determine a prefetch time point, which is a time point at which the prefetch data is prefetched to the host device, based on the request time information and a transmission latency received from the host device.

6. The memory expanding device of claim 5, wherein the prefetch decision circuit is further configured to prefetch the prefetch data to the host device at the prefetch time point.

* * * * *